Inventor
MICHEL L. AVIGNON
By [signature]
Attorney

ANALOG INFORMATION STORING DEVICE

Inventor
MICHEL L. AVIGNON
By [signature]
Attorney

ANALOG INFORMATION STORING DEVICE

Inventor
MICHEL L. AVIGNON
By [signature]
Attorney

United States Patent Office 3,430,225
Patented Feb. 25, 1969

3,430,225

ANALOG INFORMATION STORING DEVICE

Michel Louis Avignon, Neuilly-sur-Seine, France, assignor to International Standard Electric Corporation, New York, N.Y., a corporation of Delaware Filed Apr. 7, 1965, Ser. No. 446,337
Claims priority, application France, Apr. 14, 1964, 970,820
U.S. Cl. 340—347 20 Claims
Int. Cl. H04l *3/00;* H03k *13/24*

The present invention concerns improvements to analog information storing circuits to which information is supplied by means of a sampling circuit and more particularly to such a storage device employed with a data treatment system operating in time division multiplex.

In such a system comprising *m* channels, the *m* analog input signals are successively sampled during the duration of a frame period. The frame period is thus divided into *m* "channel time slots or intervals" of equal duration. During each channel time slot the amplitude of the corresponding analog information is stored in a "holding" condenser. The information which is present at the input in space multiplex is thus transformed by sampling into time division multiplex and can be transmitted either in the resulting pulse amplitude modulation, or after a coding operation in the form of pulse width modulation, pulse position modulation, or pulse code modulation.

In the systems with a high operating speed, the sampling and holding operations are controlled by means of electronic gates and when coding takes place, the coder is constituted by electronic circuits. The variations of the D.C. voltages involved in these circuits, the variations of the characteristics of the components, and the temperature variations induce modifications to the value of the output information. Thus, in the case, for instance, where this latter information is supplied by an analog to digital coder, the same number N*o* is not always obtained each time a given voltage V*o* is coded. In order to obviate this inconvenience, it is necessary to use a first correction circuit or "centering correction circuit" such as described in the copending U.S. application of M. L. Avignon-A. L. T. Le Maire, entitled, "Self-Centering Analog to Digital Coder," Ser. No. 364,920, filed May 5, 1964. The information which enables the carrying out of this correction is of a discontinuous nature and is obtained by the comparison of a reference voltage with the sum of the voltage stored in the storage condenser and the correction voltage.

Furthermore, in order to obtain the best possible accuracy for coding, it is necessary, first, to avoid any crosstalk between the analog information sampled at adjacent channel time slots and, second, to maintain constant the voltage to be coded during the whole coding duration. In order to avoid the crosstalk, charge and discharge circuits with very low time constant are associated with the holding condenser, and the sampling is carried out only during a fraction of the channel time slot. Nevertheless, the coding time is approximately equal to the channel time, so that the reading circuit of the information stored in the condenser must have a very high input imedance. In practice, the circuits connected to the terminals of the storage condenser present conductances which are not negligible and the condenser discharges in an appreciable manner during the coding time. The term "loss correction" is defined herein and in the claims as that correction needed to overcome the storage condenser discharge or loss during the coding time.

An object of the present invention is to employ a sampled-data circuit for obtaining an automatic loss correction.

Another object of the present invention is to provide in a sample and hold circuit an automatic centering correction and an automatic loss correction.

Still another object of the present invention is the application of the automatic loss correction device to a feedback coder of the comparison type.

A feature of this invention is the provision of an analog storage means to store in a predetermined or calibration time interval a calibration voltage having a nominal value equal to the predetermined value of a reference voltage, first means to produce a first signal proportional to the difference between the value of said stored calibration voltage and the value of said reference voltage at the beginning of said time interval, second means to produce a second signal proportional to the difference between the value of said stored calibration voltage and the value of said reference voltage at the end of said time interval, third means responsive to said first signal to maintain the difference between the value of said stored calibration voltage and the value of said reference voltage less than a first given value, and fourth means responsive to at least one of said first and second signals to maintain the difference between the value of said stored calibration voltage and the value of said reference voltage at both the beginning and end of said time interval less than a second given value.

Another feature of this invention is the provision of an analog storage means under control of a timing signal to sequentially store in each frame period a sample of *m* signal sources in their associated channel time interval or slot, one of said signal sources being a calibration voltage sampled during its appropriate channel time interval, a first means operable during each of said calibration voltage channel interval to produce a first signal proportional to the difference between the value of said stored calibration voltage and the value of said reference voltage at the beginning of said calibration voltage channel interval, second means operable during each of said calibration voltage channel interval to produce a second signal proportional to the difference between the value of said stored calibration voltage and the value of said reference voltage at the end of said calibration voltage channel interval, third means responsive to said first signal during each of said calibration voltage channel interval to maintain the difference between the value of said stored calibration voltage and the value of said reference voltage less than a first given value during each of said frame periods, and fourth means responsive to at least one of said first and second signals during each of said calibration voltage channel interval to maintain the difference between the value of said stored calibration voltage and the value of said reference voltage at both the beginning and end of said calibration voltage channel interval less than a second given value in each of said frame periods.

Still another feature of this invention is the provision of a feedback comparison coder employing the above described time division multiplex arrangement wherein said second means includes a first bistable device to produce a digital output for each of said channel intervals, and a means responsive to said first bistable device under control of the timing signals to produce said second signal; said fourth means includes a second bistable device coupled to said first bistable device to receive the digital output from said first bistable device during the first digit portion of said calibration voltage channel time and produce said first signal; the coded output for each of said channel intervals except said calibration voltage channel interval is coupled from said first bistable device; and said reference voltage is produced by a decoder coupled to said first bistable device during all said channel intervals, said decoder being modified during said calibration voltage channel interval to alter the normal operation thereof to determine the value of said reference voltage during said calibration voltage channel interval.

A further feature of this invention is the provision of an embodiment of said fourth means of the above-described arrangements which responds to both said first and second signals.

Still a further feature of this invention is the provision of an embodiment of said fourth means of the above described arrangements which responds to said second signal.

The above-mentioned and other features and objects of this invention will become more apparent by reference to the following description taken in conjunction with the accompanying drawings, in which:

FIG. 1 is a schematic diagram in block diagram form of the general diagram of the analog storage circuit AS according to the principles of this invention associated, as a non-limitative example, to an analog to digital coder CD. The system operates in time division multiplex under the control of the time signals delivered by clock 100.

Figure 1:
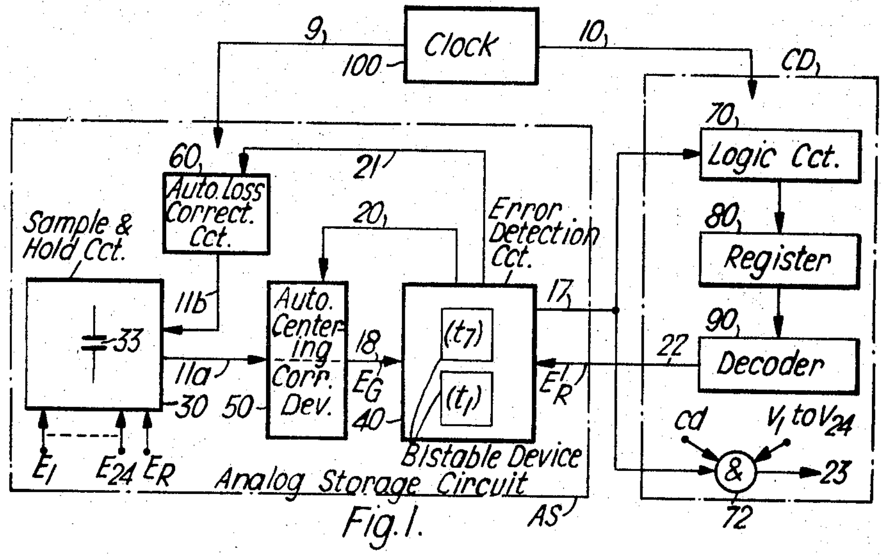
FIG. 1 is a schematic diagram in block diagram form of an analog storage circuit and its associated coder according to the principles of this invention.

The operation of circuit AS will be described in conjunction with a pulse code modulation multiplex system wherein the number of multiplexed channels $m=25$.

Under these conditions, clock 100 delivers the following signals:

Channel time slot signals referenced V1 to V25 supplied in time succession all these signals having the same duration;

Digit time slot signals referenced *t*1 to *t*8 dividing each channel time slot into eight time intervals of equal duration. If each analog information is coded into a seven digit number, the time *t*8 is used as guard time between two adjacent channels; and Basic time slot signals, *a, b, c, d* dividing each digit time slot into four time intervals of equal duration.

These signals are transmitted to circuits AS and CD through the conductors 9 and 10.

The principle of operation of circuit AS will be described now in relation with FIG. 1, assuming that coder CD is disconnected and that the input conductor 22 of circuit AS receives, at the calibration time, for instance time interval V25, a reference signal of amplitude $E'_R$.

The circuit AS comprises:

Sample and hold circuit 30;

Error detection circuit 40;

Automatic centering correction circuit 50; and

Automatic loss correction circuit 60.

Circuit 30 controls the sampling in time succession of analog voltages E1 through E24 and of the calibration voltage $E_R$ as well as the holding, during a channel time slot, of each one of the information thus obtained. The holding function is fulfilled by a storage condenser which has been represented symbolically in circuit 30 as condenser 33 and the stored voltage appears on output conductor 11*a*. It will be assumed first of all that this voltage is directly transmitted to input 18 of circuit 40 through the connection shown in dotted line which crosses circuit 50.

At the time V25, circuit 30 controls the sampling and the holding of the calibration voltage $E_R$, the reference voltage $E'_R$ being selected according to the following relation:

$$E'_R=E_R-e_0$$

where $e_0$ represents the rated value of the voltage drop between the input of circuit 30 and the input of circuit 40. This voltage drop is produced, first, by the electronic gates which assure the sampling and holding, and second, by a summation circuit located in circuit 50. In addition, $E_G$ will designate the value of the voltage which appears on input 18 of circuit 40.

Circuit 40 includes a comparator which delivers, at each digit time slot, information including the differences between the applied voltages $E_G$ and $E'_R$ and the polarity of this difference. From these bits of information, those obtained at the digit time slots *t*1 and *t*7 of the calibration time V25 are stored in two bistable storage elements shown symbolically inside circuit 40 by rectangles referenced respectively 41 and 47.

The centering correction and the loss correction are carried out, under the control of this information, by means of two distinct feedback loops. The centering correction loop includes circuit 50 and uses the information stored in the bistable circuit 41 for correcting the value of the voltage $E_G$. This information which appears on output 20 of circuit 40 charges a centering correction condenser located in circuit 50 which constitutes a voltage source, the value of which is added algebraically to that voltage on input 11*a* of this circuit. The parameters of this correction are selected in such a way that, during normal operation, the sign of the quantity $E_G-E'_R$ reverses at most once during each frame period, and the amplitude of the difference does not exceed a predetermined value $\Delta E$.

The loss correction loop includes circuit 60 and uses an information indicating the direction of variation of the voltage stored in condenser 33 during a channel time slot, this information being obtained by comparing the information stored in bistable circuits 41 and 47.

The states of bistable circuits or flip-flops 41 and 47 are transmitted to circuit 60 over conductor 21 and the result of the comparison controls the charge of a loss correction condenser located in circuit 60, the capacitance of said condenser being high with respect to that of condenser 33. The loss correction condenser constitutes then a current source or current generator which supplies, over output conductor 11*b*, a constant current which modifies the charge of holding condenser 33 in such a way as to comply with the stated conditions. The parameters of this correction are chosen in such a way that, in normal operation, the amplitude of the difference $E_G-E'_R$ does not exceed the value $\Delta E$ during a frame period. Therefore, the slope of the corrected calibration pulse reverses itself at the maximum during each frame period.

Figure 2:
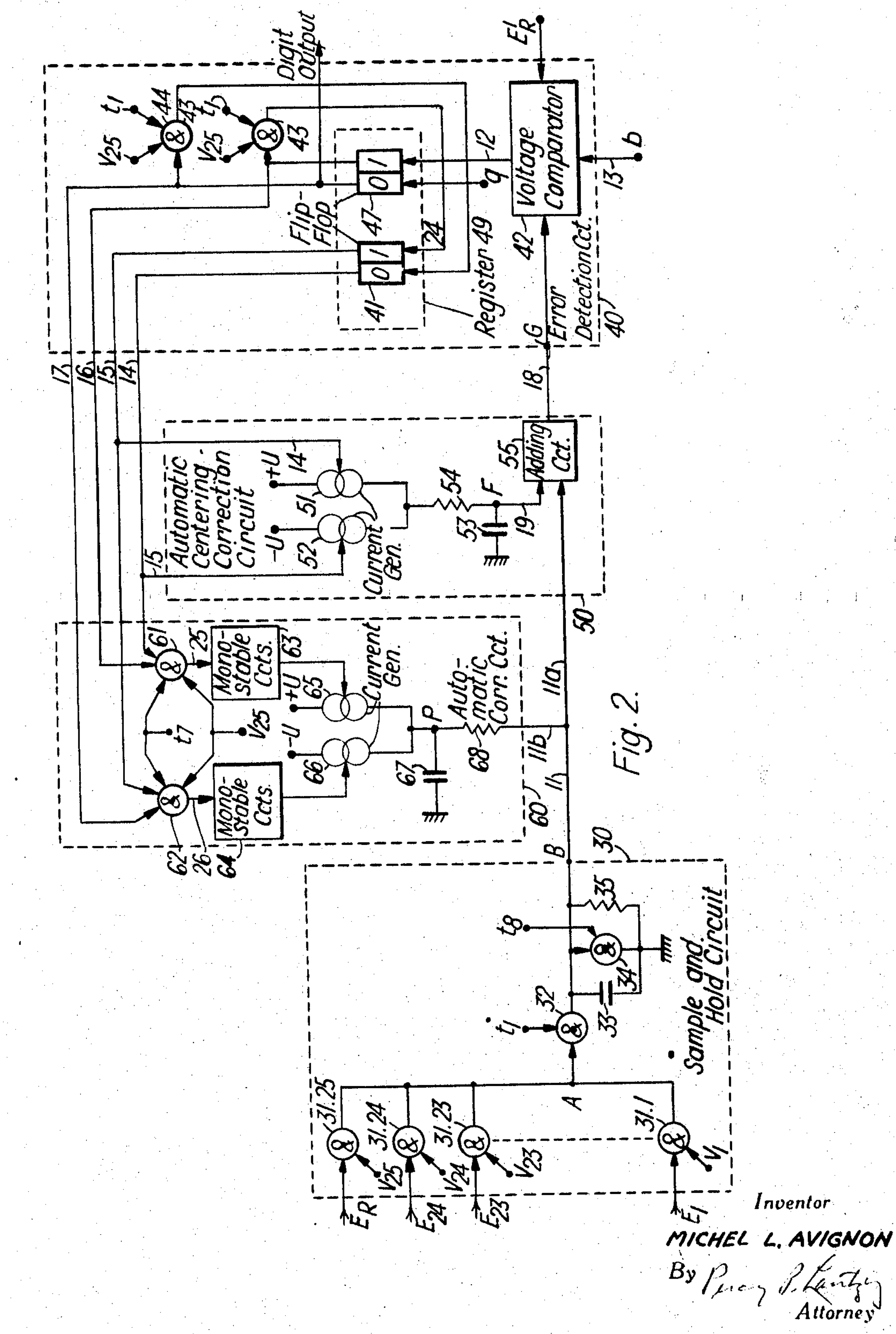
FIG. 2 is a detailed schematic diagram in block diagram form of the analog storage circuit of FIG. 1.

FIGURE 2 is a detailed schematic diagram in block diagram form of analog storage circuit AS. On this diagram certain components are represented, such as coincidence logic circuits or "AND circuits," the bistable circuits or "flip-flops," and constant current generators.

Element 43 is an AND circuit which includes two input terminals receiving respectively the time slot signals V25 and *t*1 and a third input terminal 16. This circuit is "activated" when signals are simultaneously applied on its three input terminals. In this case, a signal appears on its output terminal having a polarity equal to that of the input signals.

Element 41 is a flip-flop which may be set either in the 0 state, or in the 1 state according to whether a signal is applied on its 0 input, or on its 1 input. It will be assumed that the signals which appear on conductors 14 and 15 connected respectively to the 1 and 0 outputs of the flip-flop are of the same polarity as the input signals and that when the flip-flop is, for instance, in the 1 state, a signal appears on the 1 output. It will also be assumed that the switching time of such a circuit is at most equal to a basic time slot.

Element 51 is a current generator supplied by a voltage source of positive polarity and amplitude U, this generator being controlled by the application of a signal on its control input 14. Such a generator which delivers a constant current has been described in the copending U.S. application of M. L. Avignon-A. Y. Le Maout entitled, "Non-Linear Decoder," Ser. No. 341,035, filed Jan. 19, 1964.

Last, element 32 is an electronic gate circuit which, when it is energized by the application of a digit time slot signal *t*1, transmits on its output B the amplitude of the signal applied on its input A.

The various circuits illustrated in FIG. 2 will now be described.

The sample and hold circuit includes multiplexing gates 31–1 to 31–25, storage condenser 33, charge gate 32 and discharge gates 34 of condenser 33, and resistor 35 which represents the discharge resistance of condenser 33, the finite value of which brings a loss during each channel time.

The input voltages E1 to E24 and $E_R$ are selected by the energizing, in time succession, of gates 31–1 to 31–25 which deliver signals that are multiplexed at point A. It will be assumed further on that these voltages are positive and that their maximum value is E*c*.

At the digit time slot *t*1 of each channel time, gate 32 is energized and the voltage which is present at A is stored in condenser 33. The charge time constant of condenser 33 is chosen sufficiently low in order that condenser 33 should completely charge at most during one basic time slot.

Discharge gate 34 is energized at *t*8 so that the pulse which is present on output conductor 11 of circuit 30 lasts from the time *t*1.*b* (basic time slot *b* of the digit time slot *t*1) to the time *t*7.*d* (basic time slot *d* of the digit time slot *t*7). Owing to the presence of resistor 35, the amplitude of this pulse decreases with time. The signal which appears on output conductor 11 is applied to input terminal 18 of error detection circuit 40 after passing through an adding circuit 55 in which it is algebraically added to the centering correction voltage appearing on conductor 19. It will be assumed provisionally that point F is at the ground potential.

Circuit 40 includes voltage comparator 42, register 49 which includes flip-flops 41 and 47, and AND circuits 43 and 44.

Comparator 42 is activated during a fraction of each digit time slot by the application of a basic time slot signal *b* on its input 13 and it is so designed that a signal appears on its output 12 when the voltage $E_G$ applied on its input 18 is lower than the voltage $E'_R$ or:

$$E_G < E'_R \qquad (1)$$

It is assumed with this inequality that comparator 42 is perfect. Nevertheless, in practice, each comparator presents a range of indetermination which will be taken into account during the description of FIG. 3.

The output 12 of comparator 42 is connected to the 1 input of flip-flop 47 which is set to the 0 state at each basic time slot *a*. At the beginning of each digit time slot, flip-flop 47 is thus in the 0 state and, if the inequality (1) is satisfied, it is in the 1 state during the basic time slots *c* and *d*.

AND circuits 43 and 44 are activated only during the time V25.*t*1 (digit time slot *t*1 of the channel time V25) so that the state of flip-flop 47 is transferred to flip-flop 41 from the time *t*1.*c* on, and is available at the time *t*1.*d*. It is thus seen that flip-flop 41 keeps in storage, during a frame period, the result of the comparison carried out between the voltages $E_G$ and $E'_R$ at the digit time slot *t*1 of the calibration time V25. As to flip-flop 47, it indicates, at each digit time slot, the result of the comparison which thus provides the resultant digit output on conductor 17 for all channel times. As far as the correction arrangement is concerned the only result which is used for correction purposes is that result obtained at time *t*7 of calibration time V25.

It should be noted that the information written in these two flip-flops are exploited by the automatic correction circuits only at the calibration time V25.

The centering correction circuit 50 includes current generators 51 and 52, centering correction condenser 53, resistance 54 and adding circuit 55. Since the circuit shown is a particular mode of achievement of the device described in the above-cited U.S. application of M. L. Avignon-A. Y. Le Maout, entitled, "Non-Linear Decoder," its operation will be described briefly.

As previously mentioned, the aim of the centering correction is to compensate for the analog voltage variations between the input of circuit 30 and input 18 of circuit 40 which are due in particular to the following causes:

Variations of the D.C. voltages present in the various electronic circuits;

Variations of the characteristics of the components due to aging or to change; and Temperature variations.

If it is assumed that the electronic gates 31–1 to 31–25 are identical and have the same voltage drop when they are activated, the rated voltage drop $e_0$, defined hereinabove for the time V25, is the same at each channel time and the fluctuations of its value in relation with the variations defined hereabove appear in the form of variations of the voltage $E_G$.

The current generators of centering correction circuit 50 are obtained from voltage sources delivering a voltage of amplitude U, this voltage being positive for generator 51 and negative for generator 52. Since the control inputs 14 and 15 of these generators are connected to the 1 and 0 outputs of flip-flop 41, one of them operates permanently through the resistance 54, this modifying the charge of condenser 53 through all channel times.

When the inequality (1) is satisfied, flip-flop 41 is set to the 1 state and generator 51 is triggered so that the potential of point F with respect to ground becomes more positive. Since this voltage is added, in adding circuit 55, to that voltage delivered by circuit 30 over conductor 11*a*, the voltage $E_G$ increases.

When voltage $E_G$ reaches a value such that $E_G > E_R$, flip-flop 41 is set to the 0 state, generator 52 is triggered and the potential of point F becomes more negative. The voltage $E_G$ decreases so that, at one of the following measurements, the inequality (1) is once again fulfilled and the voltage $E_G$ increases again. It is thus seen that this voltage oscillates around a certain equilibrium value which will be described hereinbelow in relation with FIG. 3.

Figure 3:
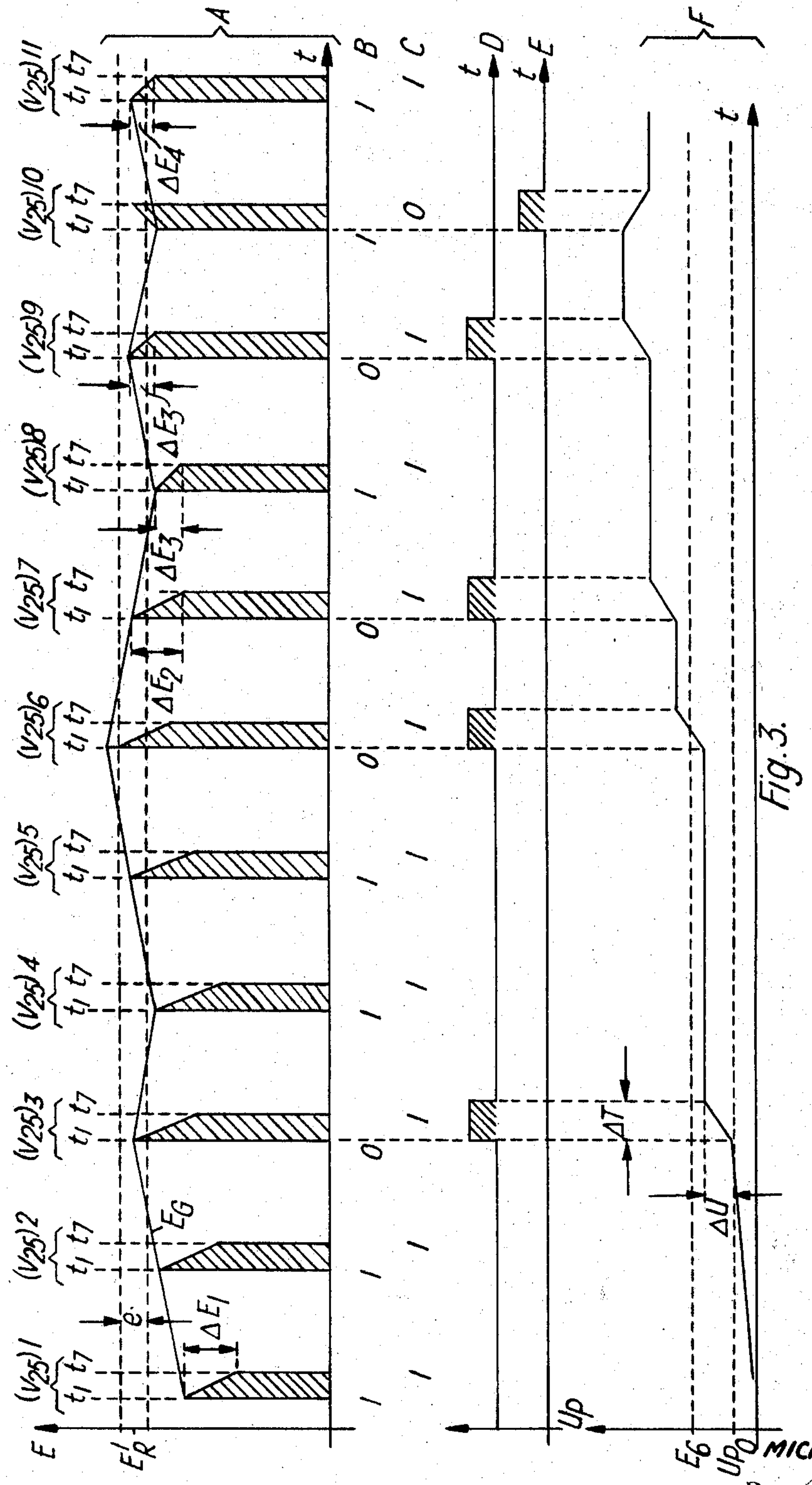
FIG. 3 illustrates a number of signal diagrams related to the operation of the system of FIG. 2.

Calibration signals during a certain number of successive frame periods, referenced (V25)1 to (V25)11, have been shown in curve A, FIG. 3. It is assumed that the centering correction circuit is switched on before the time (V25)1 and that the voltage $E_G$ applied on input 18 of the comparator is lower, in (V25)1, than the reference voltage $E'_R$.

As it has been mentioned during the description of FIG. 2, the comparator presents an indetermination zone the amplitude of which has been referenced *e* in curve A, FIG. 3. When the difference between the voltage compared during a calibration time is less than *e*, the state in which flip-flop 41 sets itself cannot be determined a priori, this state depending upon the characteristics of the comparator and the noise superimposed at this instant on the compared signals.

Under the conditions stated hereabove, at the time (V25)1, $E_G - E'_R < 0$. Flip-flop 41 is set to the 1 state, generator 51 is triggered and the voltage $E_G$ increases. The same thing happens at the time (V25)2 and the voltage $E_G$ increases further on.

In (V25)3 the indetermination zone of the comparator is reached and it will be assumed that flop-flip 41 sets to the 0 state. The generator 52 is then triggered and the voltage $E_G$ decreases. In (V25)4, the output of conductor 42 is outside the indetermination zone so that flip-flop 41 sets to the 1 state and the voltage $E_G$ begins to increase. If it is assumed that flip-flop 41 sets again in the 1 state in (V25)5—when in the indetermination zone—voltage $E_G$ increases further. In (V25)6 the output of comparator 42 is outside the indetermination zone, flip-flop 41 resets to the 0 state and the voltage $E_G$ decreases. If the flip-flop 41 resets to the 0 state in (V25)7—when in the indetermination zone—the voltage $E_G$ decreases further. In (V25)8, flip-flop 41 sets to the 1 state and the voltage $E_G$ increases. Last, if this flip-flop resets in the 0 state in (V25)9—when in the indetermination zone—the voltage $E_G$ decreases.

The calibration pulses of the times (V25)10 and (V25)11 have also been shown in curve A, FIG. 3 assuming that flip-flop 41 sets to the 1 state at the time (V25)11.

It is seen that the oscillation of the voltage $E_G$ presents a peak-to-peak value, measured for instance at times (V25)6 and (V25)8, slightly higher than the value *e* and that it does not present a regular periodicity owing to the indetermination zone of comparator 42.

By suitably choosing the parameters of the circuits (currents supplied by generators 51 and 52, value of resistor 54, and value of condenser 53), the peak-to-peak amplitude of the oscillation may be controlled in such a way that the difference between the compared voltages $E_G$ and $E'_R$ does not exceed a predetermined value ΔE, with $\Delta E > e/2$.

It should be noted that the centering correction may also be made by modifying the value of the reference voltage $E'_R$. In this case, the voltage which appears at point F is added to the reference voltage after having reversed the polarities of the supply voltages of generators 51 and 52.

Automatic loss correction circuit 60 includes AND circuits 61 and 62, monostable circuits 63 and 64, current generators 65 and 66, loss correction condenser 67, and resistor 68.

The two AND circuits 61 and 62 constitute the comparator of the states of the two flip-flops of register 49, this comparator delivering a signal on one of its output terminals 25 or 26 only at the time V25.*t*7 (digit time slot 7 of the channel time V25).

The information to be compared is constituted by the signals which appear on conductors 14 and 15 connected to the 1 and 0 outputs of flip-flop 41 and on conductors 16 and 17 connected to the 1 and 0 outputs of flip-flop 47. Conductors 15 and 16 are connected to two inputs of the AND circuit 61 and conductors 14 and 17 to two of the inputs of the AND circuit 62.

This comparator presents the following characteristics:

(a) It delivers a signal on output 25 when register 49 is in the 01 state, the first one of these digits characterizing the state of flip-flop 41, and the second one of these digits characterizing the state of flip-flop 47.

(b) It delivers a signal on output 26 when register 49 is in the 10 state.

(c) It delivers no signal at all when register 49 is in one of the 00 or 11 states.

Each one of the monostable circuits delivers, when it receives a signal from the AND circuit which controls it, a signal having a duration of ΔT which triggers the current generator to which it is coupled.

Figures 4, 5:
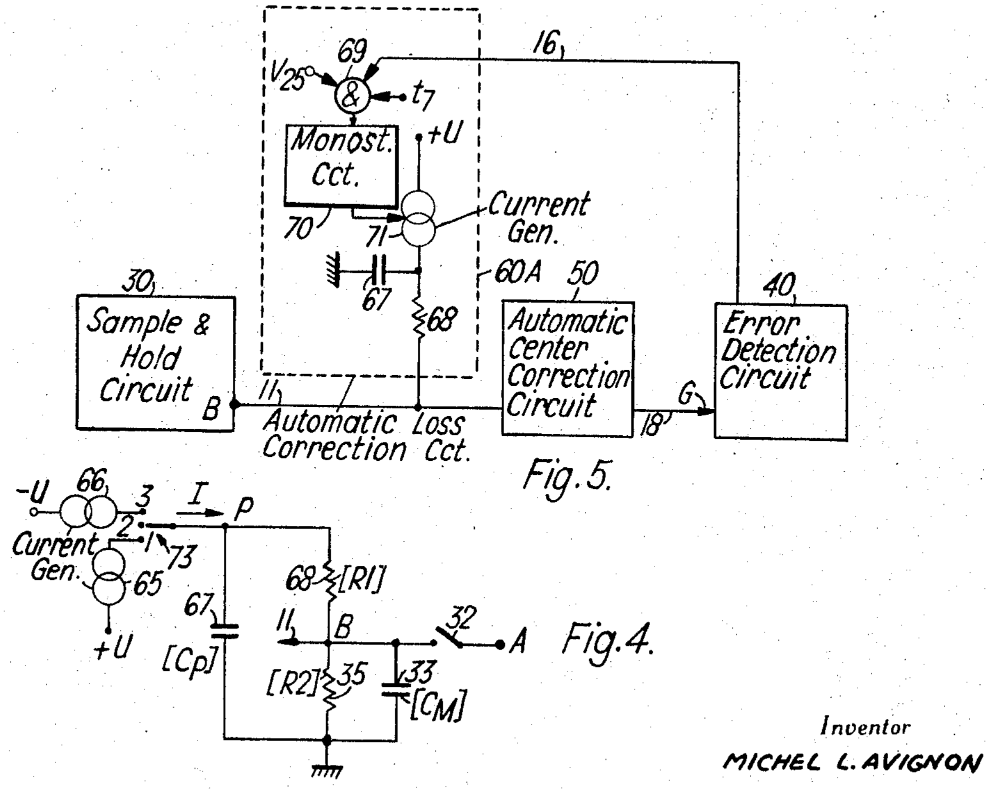
FIG. 4 is a schematic diagram illustrating the equivalent circuit of the charge and discharge paths of the loss correction condenser of FIG. 2.
FIG. 5 is a schematic diagram in block diagram form of another embodiment of the automatic loss correction circuit according to the principles of this invention.

FIG. 4 represents the equivalent diagram of the loss correction circuit. In this diagram, the signals delivered by the comparator including AND circuits 61 and 62 have been shown symbolically by the three-position switch 73, position 1 corresponding to the 01 state, position 2 to the 11 and 00 states, and position 3 to the 10 state. It will be noted that this switch can be in position 1 or 3 only during a time duration ΔT at the end of a time V25 and it will be seen, during the description of the operation, that it can be in the position 2 during several consecutive times V25.

In addition, the following designations have been adopted:

R1 and R2=the values, respectively of resistors 68 and 35; and $C_P$ and $C_M$=the values, respectively, of condensers 67 and 33.

It is seen that when switch 73 is in position 1 (or in position 3) condenser 67 is charged to a positive (negative) voltage. The value of the current delivered by source 65 (66) depending, first, upon the charge time constant of condenser 67 which is determined by the internal resistance of the source and the value $C_P$, and, second, upon the charge circuit of condenser 67 (elements R1, R2, $C_M$).

It will now be assumed that the loss correction circuit constituted by the elements 65, 66, 67, and 68 is connected to the terminals of condenser 33, that the difference of potential across the terminals of condenser 67 is zero, and switch 73 is in position 2.

Under these conditions, when switch 32 is closed at *t*1, condenser 33 is charged to a value $E_G = U_B$ ($U_B$ being the voltage at point B, FIG. 4). As soon as the switch 32 is open, condenser 33 discharges through the circuit connected to its terminals, resulting in: $U_B < E_G$. At *t*7, the comparator is—as it will be shown further on—in the 01 state, switch 73 sets in position 1, and condenser 67 receives a charge $I \times \Delta t$. The potential of point P increases by ΔU, which corresponds to an increase $m.\Delta U$ of the potential of point B where $$m = \frac{R2}{R1 + R2}$$

Switch 73 remains in position 1 during a certain number of frame periods up to the time where $U_B > E_G$. From that time on, condenser 33 receives a correction current which tends to reduce its loss.

After a certain time, an over-compensation of the loss takes place and switch 73 is set to position 3. The potential of point P is reduced by ΔU and, when $U_B < E_G$, condenser 33 discharges in the circuit connected to its terminals so that its loss is increased.

If the values $C_P$ and R1 are chosen sufficiently high, condenser 67 behaves like a constant current source with respect to the assembly constituted by elements 33 and 35 connected in parallel and the charge or the discharge current of condenser 33 remains constant during the time interval which separates the signals appearing on one or the other of conductors 25 or 26 (FIG. 2).

The operation of the loss correction circuit will now be described in relation with FIG. 3. In FIG. 3:

Curve A illustrates, as it has been seen during the description of the centering correction circuit, a certain number of successive calibration pulses;

Curves B and C illustrate the states of flip-flops 41 and 47 at the different channel times;

Curve D illustrates the signals of duration ΔT delivered by monostable circuit 63 when it is activated;

Curve E illustrates the signals of duration ΔT delivered by monostable circuit 64 when it is activated; and Curve F illustrates the loss correction voltage $U_P$ which appears at point P (FIG. 4).

At time (V25)1, condenser 33 presents a loss of value ΔE1 and it is seen in curves B and C, FIG. 3, that register 49 is in the 11 state. The same thing happens at (V25)2 so that, up to (V25)3, generators 65 and 66 (FIG. 2) are both blocked and the loss remains equal to ΔE1, or even tends to increase, if condenser 67 is discharged (case studied in relation with FIG. 4). This loss current of condenser 33 may contribute to the charge of condenser 67, thus resulting in a slight increase of the voltage $U_P$ at the times (V25)1 to (V25)3 as indicated in curve F, FIG. 3.

At (V25)3, register 49 sets to the 01 state (it was assumed during the study of the center correction, that flip-flop 41 shifted to the 0 state) and generator 65 operates during a time ΔT (see curve D, FIG. 3). The voltage of point P which was equal to $U_{PO}$ increases by a value ΔU (see curve F, FIG. 3).

It will be assumed that at this moment $$m(U_{PO}+\Delta U)<E_G.$$

The loss of condenser 33 thus remains higher than ΔE1.

At (V25)4 and (V25)5, register 49 is in the 11 state and the current generators are blocked. At (V25)6, register 49 is in the 01 state and the voltage $U_P$ increases by ΔU (see curves D and F, FIG. 3).

If it is assumed that at this moment $m(U_{PO}+2\Delta U)>E_G$, condenser 67 delivers a current to condenser 33 the loss of which decreases up to a value ΔE2 such as is illustrated on the calibration pulse at time (V25)7 (see curve A, FIG. 7). At time (V25)7, register 49 is once again in the 01 state and the voltage $U_P$ reaches the value $m(U_{PO}+3\Delta U)$ (see curves D and F, FIG. 3). The loss of condenser 33 decreases and attains a value ΔE3. (See time (V25)8, curve A, FIG. 3.)

At time (V25)8, register 49 is in the 11 state and at time (V25)9 the loss is still ΔE3 but the register is then in 01 state. The voltage $U_P$ increases by ΔU and an over-compensation of the loss takes place as it may be seen on the calibration pulse at time (V25)10, curve A, FIG. 3. If it is assumed that at (V25)10, flip-flop 47 (FIG. 2) resets to the 0 state, register 49 is in the 10 state and generator 66 is triggered (see curve E, FIG. 3). The potential at point P decreases by ΔU (see curve F, FIG. 3) and the over-compensation is reduced. At (V25)11, register 49 is in the 11 state, condenser 33 presents a loss of ΔE4, and generators 65 and 66 (FIG. 2) are blocked.

Loss correction circuit 60 is then in the same condition as illustrated at time (V25)8 and register 49 is set alternatively to the 01 and 10 states (the other states of register 49 which do not modify the voltage $U_P$ are not taken into account). Voltage $U_P$, illustrated in curve F, FIG. 3, oscillates around an average value equal, in this case to $U_{PO}+3.5\Delta U$ and the loss correction is set up.

It will be noted in curves B and C, FIG. 3, that register 49 was never in the 00 state. This case may nevertheless happen, for instance, when the loss correction is perfect and that comparator 42 operates within its indetermination zone.

It is seen that the operation of the overall system occurs in three successive steps:

(1) Register 49 is always in the 11 state which corresponds to the setting up of the centering correction;

(2) Register 49 shifts, at certain calibration times, to the 01 state indicating that the centering correction is established and the loss correction begins to operate;

(3) Register 49 shifts alternatively to the 01 and 10 states (the 11 and 00 states are not taken into account) indicating that the two corrections are established.

In the automatic loss correction circuit just described in relation with FIGS. 2 and 3, monostable circuits 63 and 64 may be eliminated, the time interval ΔT being then determined by the clock signals.

However, it will be noted that flip-flop 47 stores the information related to the time *t*7 only during the time slots *t*7.*c* and *t*7.*d* so that the time interval ΔT cannot exceed the value of two basic time slots. If it is necessary to increase this value, there may be inserted, on the inputs of flip-flop 47, two AND circuits which will be blocked during a certain fraction of the time *t*8, so that the value of ΔT will be lengthened up to six basic time slots.

FIG. 5 is a schematic diagram in block diagram form of an alternative embodiment of the loss correction circuit 60A coupled to circuits 30, 40, 50 which are identical to those described hereabove. Circuit 60A includes condenser 67 and resistor 68 which play the same role as in circuit 60 (FIG. 2), a three input AND circuit 69, monostable circuit 70 and current generator 71 connected to a positive voltage source.

In the description of FIG. 4, it has been taught that, by a suitable choice of the value of resistor 68, the charge of condenser 67 remained practically constant between the corrections.

In the simplified circuit of FIG. 5, the charge of condenser 67 is modified only when the slope of the calibration pulse is negative and its discharge circuit is designed in such a way that it slowly loses its charge so that an over-compensation cannot remain.

As seen in curve A, FIG. 3, the slope is negative when register 49 is in either the 11 or 01 states. Thus, flip-flop 41 and the comparator including AND circuits 61 and 62 can be eliminated. Instead AND circuit 69 is employed which is activated when flip-flop 47 is in the 1 state at time V25.*t*7, this information being supplied on conductor 16.

As it was previously mentioned, the storage device just described can be used in a feedback analog to digital coder and more particularly in a comparison coder such as the one described in the book "Notes on Analog Digital Conversion" by A. K. Susskind (MIT publication), pages 554 to 560.

It is known that such a coder includes a register of capacity $2^n-1$ numbers for coding a signal of amplitude *v* into a number of *n* digits and a decoder coupled to the register which delivers a voltage *ed* representing the analog value of the number written in the register. The operation processes in sequence, in *n* "digit time slots," the determination of the *n* digits of the code, the first time slot being reserved to the determination of the most significant digit, the second time slot to the determination of the next less significant digit, etc.

The register being initially cleared, the most significant flip-flop, or flip-flop of rank one, is set in the 1 state and the corresponding voltage *ed* produced by the decoder is compared to the signal to be coded. If $v-ed>0$, the most significant digit is 1 and the state of the flip-flop of rank one is not modified. If $v-ed<0$, the digit of rank one is 0, and said flip-flop is reset to the 0 state.

The same operation is carried out at the next time after the flip-flop of rank two has been set to the 1 state. The different digits of the code are thus determined successively and, at the end of the *n*th time slot, the number corresponding to the voltage *v* is available in the register in parallel form. The code may also be obtained in series form by using, at each digit time slot, the signal which characterizes the sign of the difference between the compared voltages.

In such a coder—as well as in all other types of coders—the same number N*o* which will be called a "check code" must be obtained each time a given voltage V*o* is coded. As it has been seen hereinabove, this does not happen in practice due to the variations of the voltages, of the component characteristics, and of the temperature.

It will be noted that for an *n* digit code one can obtain an even number ($2^n$) of different numerical values. If it is assumed that $Vo=Er=Ec/2$ (Ec being the maximum range of admissible voltages to be coded), the check code does not represent exactly the value $Ec/2$ but rather a value which differs by ±1 coding interval.

The check code obtained is thus either the code $N'o=2^{n-1}-1$ or the code $N''o=2^{n-1}$ which differ, in particular, by the fact that the most significant digit is, respectively, 0 or 1.

FIG. 1 illustrates coder CD of this type to which is coupled the automatic correction arrangement of storage circuit AS which has been described in detail in relation with FIGS. 2 and 3. This coder comprises logical circuit 70, register 80 and decoder 90. The output signal of decoder 90 is applied to input conductor 22 of circuit 40.

At time *t*1, the code $2^{n-1}$ is stored in register 80 and the output voltage *ed* of decoder 90 represents, at the calibration time V25, the reference voltage. This voltage is compared, in circuit 40, to the calibration voltage V*o*. As it has just been seen the sign of the difference $Vo-ed$ gives the value of the most significant digit of the code, this code being one of the codes N'*o* or N''*o* according to whether this sign is negative or positive.

The centering correction circuit operates then as it has been described hereabove in such a way that the value of the most significant digit oscillates between 0 and 1 and the value of ΔE is chosen to correspond to one coding interval.

In order to carry out an automatic loss correction, it is necessary to make the same operation at the time assigned to the determination of the less significant digit of the code, viz. in *t*7 if $n=7$. To that end, the operation of logical circuit 70 is modified during the calibration time V25 in such a way that, for instance, the flip-flop of rank one of register 80 should be in the 1 state at the end of each digit time slot, and that the other flip-flops should remain permanently in the 0 state. A new information on the value of the most significant digit of the check code is thus obtained in *t*7, enabling the correction of the loss of storage condenser 33 (FIG. 2).

The coded signals are obtained on conductor 17 connected to the output 0 of flip-flop 47 (FIGS. 1 and 2) and can be transmitted to output 23 of coder CD only when AND circuit 72 (FIG. 1) is activated at the basic time slots *c* and *d* in the channel times V1 to V24.

The automatic loss correction of the storage condenser operates during the whole coding time of the channels 1 to 24, under the control of information obtained during V25 by the coding of a calibration voltage of amplitude $Ec/2$. Since the input voltages E1 to E24 can take any value between 0 and Ec, it is necessary to examine the influence of the amplitude of the input voltage upon said loss correction.

It has been seen, during the description of FIG. 4, that a reduction of the loss was obtained if $U_B=mU_P>E_G$. If it is assumed that the loss correction is operating with a loss or an over-compensation of low amplitude ΔE*o* ($\Delta Eo\leq\Delta E$ for instance), one has $$U_B=\frac{Ec}{2}+\epsilon$$

and condenser 33 charges at the calibration time V25.

When an input voltage $Ei<Ec/2$ is applied in one of the times V1 to V24, the difference between the potential of point B and the charge E*i* of condenser 33 remains of the same sign and increases so that an over-compensation of amplitude higher than ΔE*o* takes place, this over-compensation being higher as E*i* tends toward zero.

When an input voltage $$Ej>\frac{Ec}{2}+\epsilon$$

is applied, the sign of the difference between these two voltages inverses and said difference increases so that a loss of amplitude higher than ΔE*o* takes place which is higher as E*j* tends towards E*c*.

The maximum loss (or over-compensation) will thus occur for the extreme values of the coding range so that the value ΔE*o* must be chosen such that the amplitude variation of the pulse between *t*1 and *t*7 is acceptable for these values of the voltages, i.e., lower than one coding interval. This condition is much easier to achieve in the case of a non-linear coder provided for coding periodical signals of average value equal to $Ec/2$, and more particularly when speech signals have to be coded. In this case, in fact, the value of the quantization intervals increases on both sides of the mean value $Ec/2$ so that the maximum admissible loss is higher as the voltage to be coded differs from this value $Ec/2$.

While I have described above the principles of my invention in connection with specific apparatus, it is to be clearly understood that this description is made only by way of example and not as a limitation to the scope of my invention as set forth in the objects thereof and in the accompanying claims.

I claim:

1. An analog information storage arrangement comprising:
- an analog storage means;
- a source of reference voltage having a predetermined value;
- a source of calibration voltage having a nominal value equal to said predetermined value;
- first means to couple said calibration voltage source to said analog storage means to store said calibration voltage therein during a predetermined time interval;
- second means coupled to said storage means and said source of reference voltage to produce a first signal proportional to the difference between the value of said stored calibration voltage and the value of said reference voltage at the beginning of said time interval;
- third means coupled to said storage means and said source of reference voltage to produce a second signal proportional to the difference between the value of said stored calibration voltage and the value of said reference voltage at the end of said time interval;
- fourth means coupled to said second means and a given one of said storage means and said source of reference voltage responsive to said first signal to maintain the difference between the value of said stored calibration voltage and the value of said reference voltage less than a first given value; and
- fifth means coupled to at least one of said second and third means responsive to at least one of said first and second signals to maintain the difference between the value of said stored calibration voltage and the value of said reference voltage at the beginning and end of said time interval less than a second given value.

2. An arrangement according to claim 1,
wherein said fourth means is coupled to said storage means.

3. An arrangement according to claim 2,
wherein said fifth means is coupled to said second and third means responsive to said first and second signals.

4. An arrangement according to claim 2,
wherein said fifth means is coupled to said third means responsive to said second signal.

5. An arrangement according to claim 1,
wherein said fifth means is coupled to said second and third means responsive to said first and second signals.

6. An arrangement according to claim 1,
wherein said fifth means is coupled to said third means responsive to said second signal.

7. An analog information storage arrangement comprising:
- an analog storage means;
- a source of reference voltage having a predetermined value;
- a source of calibration voltage having a nominal value equal to said predetermined value;
- first means to couple said calibration voltage source to said analog storage means to store said calibration voltage therein during a predetermined time interval;
- second means coupled to said storage means and said source of reference voltage to compare the value of said stored calibration voltage and the value of said reference voltage at given times during said time interval;
- third means coupled to said second means to produce a first signal proportional to the difference between the value of said stored calibration voltage and the value of said reference voltage at the beginning of said time interval;
- fourth means coupled to said second means to produce a second signal proportional to the difference between the value of said stored calibration voltage and the value of said reference voltage at the end of said time interval;

fifth means coupled to said third means and a given one of said storage means and said source of reference voltage responsive to said first signal to maintain the difference between the value of said stored calibration voltage and the value of said reference voltage less than a first given value; and sixth means coupled to at least one of said third and fourth means responsive to at least one of said first and second signals to maintain the difference between the value of said stored calibration voltage and the value of said reference voltage at both the beginning and end of said time interval less than a second given value.

8. An arrangement according to claim 7, wherein said storage means includes a first capacitor.

9. An arrangement according to claim 8, wherein said fifth means includes a second capacitor charged in response to said first signal to adjust the voltage output of said first capacitor.

10. An arrangement according to claim 8, wherein said sixth means includes a second capacitor charged in response to said second signal to adjust the charge of said first capacitor.

11. An arrangement according to claim 8, wherein said fifth means includes a second capacitor charged in response to said first signal to adjust the voltage output of said first capacitor; and said sixth means includes a third capacitor charged in response to said second signal to adjust the charge of said first capacitor.

12. An analog information storage arrangement comprising:

an analog storage means;

a source of reference voltage having a predetermined value;

a source of calibration voltage having a nominal value equal to said predetermined value;

first means to couple said calibration voltage source to said analog storage means to store said calibration voltage therein during a predetermined time interval;

second means coupled to said storage means and said source of reference voltage to produce a first signal proportional to the difference between the value of said stored calibration voltage and the value of said reference voltage at the beginning of said time interval;

third means coupled to said storage means and said source of reference voltage to produce a second signal proportional to the difference between the value of said stored calibration voltage and the value of said reference voltage at the end of said time interval; and fourth means coupled to at least one of said second and third means responsive to at least one of said first and second signals to maintain the difference between the value of said stored calibration voltage and the value of said reference voltage at both the beginning and end of said time interval less than a given value.

13. An arrangement according to claim 12, wherein said fourth means is coupled to said second and third means responsive to said first and second signals.

14. An arrangement according to claim 12, wherein said fourth means is coupled to said third means responsive to said second signal.

15. An analog information storage arrangement comprising:

an analog storage means;

a source of reference voltage having a predetermined value;

a source of calibration voltage having a nominal value equal to said predetermined value;

first means to couple said calibration voltage source to said analog storage means to store said calibration voltage therein during a predetermined time interval;

second means coupled to said storage means and said source of reference voltage to compare the value of said stored calibration voltage and the value of said reference voltage at given times during sa idtime interval;

third means coupled to said second means to produce a first signal proportional to the difference between the value of said stored calibration voltage and the value of said reference voltage at the beginning of said time interval;

fourth means coupled to said second means to produce a second signal proportional to the difference between the value of said stored calibration voltage and the value of said reference voltage at the end of said time interval; and fifth means coupled to at least one of said third and fourth means responsive to at least one of said first and second signals to maintain the difference between the value of said stored calibration voltage and the value of said reference voltage at both the beginning and end of said time interval less than a given value.

16. An analog information storage arrangement comprising:

first means to establish $m$ successive channel time intervals of equal duration in each of a plurality of frame periods;

$m-1$ sources of channel signals;

a source of reference voltage having a predetermined value;

a source of calibration voltage having a nominal value equal to said predetermined value;

an analog storage means;

second means coupled to said first means, said storage means, said $m-1$ sources of channel signals, and said source of calibration voltage for successive sampling of said channel signals and said calibration voltage during said $m$ channel intervals of each of said frame periods and successively store during their associated one of said channel intervals said sampled channel signals and said sampled calibration voltage in said storage means;

third means coupled to said storage means and said source of reference signal during each of said calibration voltage channel interval to produce a first signal proportional to the difference between the value of said stored calibration voltage and the value of said reference voltage at the beginning of said calibration voltage channel interval;

fourth means coupled to said storage means and said source of reference voltage during each of said calibration voltage channel interval to produce a second signal proportional to the difference between the value of said stored calibration voltage and the value of said reference voltage at the end of said calibration voltage channel interval;

fifth means coupled to said third means and a given one of said storage means and said source of reference voltage responsive to said first signal during each of said calibration voltage channel intervals to maintain the difference between the value of said stored calibration voltage and the value of said reference voltage less than a first given value during each of said frame periods; and sixth means coupled to at least one of said third and fourth means responsive to at least one of said first and second signals during each of said calibration voltage channel interval to maintain the difference between the value of said stored calibration voltage and the value of said reference voltage at both the beginning and end of said calibration voltage channel interval less than a second given value in each of said frame periods.

17. A feedback comparison coder comprising:

first means to establish $m$ successive channel time intervals of equal duration in each of a plurality of frame periods;

$m-1$ sources of channel signals;

a source of reference voltage having a predetermined value equal to one half the voltage range of the signals of said $m-1$ sources of channel signals;

a source of calibration voltage having a nominal value equal to said predetermined value;

an analog storage means;

second means coupled to said first means, said storage means, said $m-1$ sources of channel signals, and said source of calibration voltage for successive sampling of said channel signals and said calibration voltage during said $m$ channel intervals of each of said frame periods and successively store during their associated one of said channel intervals said sampled channel signals and said sampled calibration voltage in said storage means;

third means coupled to said storage means and said reference source to compare in each of said channel intervals the voltage stored in said storage means to said reference voltage;

fourth means coupled to said third means at the beginning of each of said calibration voltage channel intervals to produce a first signal proportional to the difference between the value of said stored calibration voltage and said reference voltage at the beginning of each of said calibration voltage channel intervals;

fifth means coupled to said third means at the end of each of said calibration voltage channel intervals to produce a second signal proportional to the difference between the value of said stored calibration voltage and said reference voltage at the end of each of said calibration voltage channel intervals;

sixth means coupled to said fourth means and a given one of said storage means and said source of reference voltage responsive to said first signal during each of said calibration voltage channel intervals to maintain the difference between the value of said stored calibration voltage and the value of said reference voltage less than a first given value during each of said frame periods;

seventh means coupled to at least one of said fourth and fifth means responsive to at least one of said first and second signals during each of said calibration voltage channel intervals to maintain the difference between the value of said stored calibration voltage and the value of said reference voltage at both the beginning and end of said calibration voltage channel interval less than a second given value in each of said frame periods; and eighth means coupled to said third means to produce in sequence a coded output for each of said channel signals.

18. A coder according to claim 17, wherein said fifth means includes a first bistable device coupled to said third means to produce a digital output for each of said channel signals and said calibration voltage; and means responsive to said first bistable device and said first means to produce said second signal; and said fourth means includes a second bistable device coupled to said first bistable device to receive the digital output from said first bistable device during the first digit portion of said calibration voltage channel time and produce said first signal.

19. A coder according to claim 18, wherein said eighth means is coupled to a given one of the outputs of said first bistable device.

20. A coder according to claim 19, wherein said source of reference voltage includes a decoder coupled to said first bistable device; and means coupled to said decoder activated by said first means during said calibration voltage channel interval for altering the normal operation of said decoder to determine the value of said reference voltage during said calibration voltage channel interval.

References Cited

UNITED STATES PATENTS

| | | | |
|---|---|---|---|
| 2,865,564 | 12/1958 | Kaiser et al. | 340—347 |
| 2,941,196 | 6/1960 | Raynsford et al. | 340—347 |
| 3,007,149 | 10/1961 | Brown | 340—347 |
| 3,056,085 | 9/1962 | James et al. | 340—347 |

MAYNARD R. WILBUR, *Primary Examiner.*

W. T. KOPACZ, *Assistant Examiner.*